United States Patent [19]

Chippaux

[11] 4,093,794

[45] June 6, 1978

[54] PROCESS FOR THE POLYMERIZATION OF VINYL CHLORIDE

[75] Inventor: Andre Chippaux, Levallois, France

[73] Assignee: Plastimer, Clichy, France

[21] Appl. No.: 609,831

[22] Filed: Aug. 29, 1975

Related U.S. Application Data

[63] Continuation of Ser. No. 376,547, Jul. 5, 1973, abandoned.

[30] Foreign Application Priority Data

Jul. 21, 1972 France .................. 72.26304

[51] Int. Cl.$^2$ .................. C08F 2/20; C08F 2/16
[52] U.S. Cl. .................. 526/344; 260/884; 526/200; 526/202; 526/216; 526/909
[58] Field of Search .............. 526/216, 225, 344, 345, 526/911, 199, 200

[56] References Cited

U.S. PATENT DOCUMENTS

| | | | |
|---|---|---|---|
| 2,934,529 | 4/1960 | van Dijk | 526/225 |
| 3,179,646 | 4/1965 | Ingraham | 526/344 X |
| 3,697,493 | 10/1972 | Meyer | 526/344 X |
| 3,856,767 | 12/1974 | Sturt | 526/75 X |

*Primary Examiner*—Christopher A. Henderson, Jr.
*Attorney, Agent, or Firm*—Pennie & Edmonds

[57] ABSTRACT

A process for the polymerization of vinyl chloride which comprises adding to an aqueous dispersion of vinyl chloride polymer prepared by a suspension polymerization process, optionally containing vinyl chloride monomer, or a bulk polymerization process the additives necessary for emulsion polymerization, then effecting the polymerization of the vinyl chloride monomer present in the reactor prior to introducing the emulsion polymerization additives and/or vinyl chloride monomer added after the introduction of these additives.

Vinyl chloride polymers comprising vinyl chloride polymer particles produced by suspension or bulk polymerization having vinyl chloride granules agglutinated thereon said granules having the dimensions of vinyl chloride granules obtained by conventional emulsion polymerization.

7 Claims, No Drawings

PROCESS FOR THE POLYMERIZATION OF VINYL CHLORIDE

This is a continuation of application Ser. No. 376,547 filed July 5, 1973, now abandoned.

BACKGROUND OF THE INVENTION

I. Field of the Invention

This invention relates to a process for the polymerization of vinyl chloride in aqueous dispersion, and to the products resulting therefrom.

II. Description of the Prior Art

The polymerization of vinyl chloride in bulk and in aqueous dispersion is a well known operation. Suspension polymerization involves the dispersion of the monomer in the form of large droplets in water with a protective agent or colloid, such as methyl cellulose and a polymerization oil soluble initiator such as benzoyl peroxide and effecting the dispersion of these droplets in water by mechanical agitation. The polymeric material which is formed during the polymerization reaction is in the form of large particles coated with the protective agent. The dispersion of the droplets and particles formed during the polymerization reaction is not very stable when the agitation is stopped. The polymeric particles which are obtained by suspension polymerization generally have a mean diameter between about $10\mu$ and $500\mu$ and preferrably between about $50\mu$ and $300\mu$. Emulsion polymerization involves the dispersion of the monomer and of the polymer in the form of fine droplets or particles by means of emulsifying agents, such as sodium laurate. The emulsifying agents are generally used in an amount so that the aqueous dispersion remains stable for a certain period of time after the agitation is stopped. The polymerization reaction is generally initiated by a water soluble polymerization initiator such as ammonium persulfate. The polymeric particles formed are fine and generally have a diameter between about $0.02\mu$ and $2\mu$.

SUMMARY OF THE INVENTION

This invention relates to a process for the polymerization of vinyl chloride which comprises adding to an aqueous dispersion of vinyl chloride polymer prepared by bulk or suspension polymerizations, (the suspension polymer optionally containing monomeric vinyl chloride) the conventional emulsion polymerization additives and effecting the polymerization of the vinyl chloride monomer which may be present in the reactor before introducing the emulsion polymerization additives and/or monomeric vinyl chloride added after the introduction of the said additives.

A first method of carrying out the present invention comprises preparing a vinyl chloride bulk or suspension polymer by a conventional bulk or suspension polymerization operation based on techniques known to one skilled in the art, then forming an aqueous dispersion of the vinyl chloride polymer, adding the emulsifier, the emulsion polymerization initiator system, and the vinyl chloride monomer, and effecting the polymerization.

When the polymerization is carried out in the presence of vinyl chloride suspension polymer which has been prepared by a conventional suspension polymerization operation, the polymer may either be drained and dried or simply drained before being formed once again into an aqueous dispersion. From the point of view of economy it is advantageous to effect the polymerization in the presence of vinyl chloride suspension polymer which is dispersed in the aqueous phase in which it was prepared.

It is usually advantageous to proceed in accordance with this first embodiment of the invention when one desired to know very accurately the weight ratio between the monomer participating in the polymerization and the vinyl chloride bulk or suspension polymer present subsequent to the introduction of the emulsion polymerization additives.

According to a second particularly advantageous embodiment of this invention, all of the polymer obtained at the end of the polymerization process forming the object of the invention can be obtained in the course of a single polymerization operation, suspension polymerization constituting the first phase of the operation and the polymerization of the monomer after the introduction of the emulsion polymerization additives constituting the second phase.

The vinyl chloride monomer which is consumed in the course of the polymerization may be introduced into the reactor at one time. The process according to the invention would then involve polymerizing only part of the vinyl chloride monomer under suspension polymerization conditions, and then adding the conventional additives for emulsion polymerization systems and continuing the polymerization to the desired degree of conversion.

According to a variation of the second embodiment of this invention, the vinyl chloride monomer may be introduced into the reactor in a plurality of stages, more particularly in two stages, it being particularly advantageous to introduce the second fraction of the monomer after the emulsion polymerization additives have been introduced.

Copolymers of vinyl chloride prepared by bulk or suspension polymerization techniques or mixtures of the copolymers themselves or with the vinyl chloride polymer can also be used for carrying out the process of the present invention. In addition, a mixture of vinyl chloride monomers with other monomers can be used in the emulsion polymerization step according to the invention. Examples of monomers that can be copolymerized with vinyl chloride in the suspension or bulk polymerization step or in the subsequent emulsion polymerization step include vinyl esters such as vinyl acetate, acrylic and methacrylic acids, maleic and fumeric esters, vinylidene chloride, and so forth. These vinyl chloride copolymer compositions have similar advantageous properties as the vinyl chloride homopolymers as set forth herein.

When the process of the current invention utilizes a vinyl chloride suspension polymer, the suspension agents, initiators, and additives conventionally used and known to those skilled in the art may be employed.

Examples of suspension agents that can be used according to this invention include carboxymethylcellulose, hydroxypropylcellulose, hydroxypropylmethylcellulose, hydroxyethylcellulose, methylcellulose, partially hydrolyzed polyvinylacetate, gelatine, and similar substances as well as mixtures thereof in amounts between 0.001% and 5%, preferrably between 0.005% and 2%, by weight of the monomer used in the suspension polymerization phase.

The oil-soluble polymerization initiators that can be used include organic peresters and peroxides, or products of the azobisisobutyronitrile type. Specific examples include lauroyl peroxide, benzoyl peroxide, tertiobutyl perpivalate, acetylcyclohexanesulphonyl peroxide, diisopropylperoxypercarbonate, azobisisobutyronitrile, and also combinations of at least two of these initiators. This initiator is used at the rate of 0.0002% - 1%, preferably 0.001% - 0.1% by weight of the monomer used in the suspension polymerization phase.

The auxiliary products usually employed in suspension polymerization processes, for example, buffers such as sodium bicarbonate, and chain transfer agents such as trichloroethylene, may also be utilized according to this invention.

The conventional emulsion polymerization components used in the process forming the object of the invention are emulsifying agents and emulsion polymerization initiators.

Examples of emulsifying agents which can be used include: ammonium or alkali metal salts of fatty acids, such as sodium laurate or myristate, the alkyl sulphonates, alkylaryl sulphonates and alkylsulphates, at the rate of 0.005% - 10%, preferably 0.05% - 5% by weight of the monomer participating in the polymerization subsequent to the addition of the said emulsifier.

The polymerization initiators which can be used include potassium and ammonium persulphates and redox pairs, at the rate of 0.0001% - 5%, preferably 0.001% - 2%, by weight of the monomer participating in the polymerization reaction subsequent to the addition of the said initiator.

The initiators, suspension agents, emulsifying agents, buffers, chain transfer agents, and other agents used for conventional emulsion polymerization reactions are well known, and the invention should not be considered as being limited to those which have been mentioned as examples.

In the vinyl chloride polymerization process developed by the applicants, the weight ratio between the polymer present in the reaction medium at the time of the addition of the emulsion polymerization components and the total polymer obtained at the end of the polymerization may vary between 5% and 99%, but is preferably between 10% and 95%.

The vinyl chloride polymers obtained by the process of the present invention are composed of particles obtained by vinyl chloride suspension or vinyl chloride bulk polymerizations having agglutinated on the surfaces thereof vinyl chloride polymer granules having the dimensions of the vinyl chloride polymer particles usually obtained by emulsion polymerization. They can be isolated from the aqueous phase and dried by the techniques usually employed for vinyl chloride suspension polymers. These products have viscosity indices measured in accordance with the French Standard NF T 51 013, of between 50 and 200.

The vinyl chloride polymers prepared by the process of this invention have properties which are improved in relation to those of vinyl chloride suspension polymers prepared in a known manner.

The vinyl chloride polymers of this invention can absorb as all suspension vinyl chloride polymers a certain amount of plasticizer and/or of various additives through simple mixing in a high speed mixer such as of the Henschel or Papenmeier type, so as to form a dry powder, also known as dry blend, which can be used directly to feed a processing machine.

The vinyl chloride polymers prepared by the process of the present invention are particularly advantageous since, the preparation of dry blends in a high speed mixer results in compositions having a higher apparent density than that of compositions obtained from a conventional vinyl chloride suspension polymer, for any given mixing temperature. It is well known that it is advantageous to feed processing machines with vinyl polymer compositions which have a high apparent density and good gelling properties.

Moreover, it was observed that the polymers prepared according to the process of this invention were characterized by particularly short melting times, that is to say, when subjected to thermal treatment under stress, for example in a processing machine, they melt in less time than conventional produced suspension resins. This improvement with regard to melting time was also observed with the dry blends prepared from these polymers.

The second embodiment of this invention results in vinyl chloride polymers which have higher plasticizer absorption capacities than conventional suspension resins produced using the same protective colloid system.

DESCRIPTION OF THE PREFERRED EMBODIMENTS

The following examples are intended to describe in greater detail, without constituting a limitation, the vinyl chloride polymerization process according to the invention.

The characteristics of the products obtained, which are indicated in the various Tables are determined in the following manner:

The bulk density of resins and dry blends is determined in accordance with the standard A.F.N.O.R. T 51.042.

Melting times are determined by means of a Brabender apparatus for dry blends prepared in a Papenmeier mixer at 120° C, their composition by weight being as follows:

| polyvinyl chloride resin | 100 parts |
| calcium stearate | 1.2 part |
| wax | 0.6 part |

Measurements were made under the following conditions:
kneading chamber: 170° C
speed of rotation of rotors: 30 revolutions per minute
load: 60.5 g.

The ability of resins to absorb plasticizer is judged by determining the setting time for the plasticizer in an oven, according to the following procedure:

100 g of polyvinyl chloride resin are mixed with 70 g of dioctylphthalate (D.O.P.), and this mixture is placed on a glass plate in an oven at 80° C. The setting time of the plasticizer is defined as being the time starting from which a sample taken from the oven no longer wets a sheet of filter paper under the following conditions: a sheet of filter paper, powder, a sheet of filter paper, a glass plate, and a load of 5 kg are laid in succession on a glass plate.

Examples 1 to 3 illustrate the first embodiment of the invention, which consists in effecting the polymerization in the presence of a polyvinyl chloride resin prepared in the course of a previous polymerization operation. Examples 4 to 13 illustrate the second embodiment of the invention, according to which all the polymer is obtained in the course of a single polymerization operation. Some examples are comparative of the prior art processes.

EXAMPLE 1

20 kg of deionised water, 4.70 kg of polyvinyl chloride suspension resin marketed by Plastimer under the registered trade mark Ekavyl SK64 and 22 g of sodium laurate are introduced in succession into a 30-liter autoclave which is internally vitrified and provided with an agitator. A vacuum is then established in the autoclave while the agitator rotates at 160 revolutions per minute, and 2 kg of vinyl chloride are introduced. The temperature of the reaction medium is brought to 60° C, and a solution of 4.5 g potassium persulphate in 100 g of water is then introduced into the autoclave while pressurizing with nitrogen.

After polymerization for 1 hour 45 minutes at this temperature, while the speed of agitation is maintained at 160 revolutions per minute, the gauge pressure in the autoclave has fallen by 3 bars. The reaction medium is then cooled and the residual monomer driven off.

The product, which is easily filtered, gives a clear filtrate. After drying, 5.90 kg of resin are collected.

The main characteristics of the resin obtained are collated in Table I in comparison with those of Ekavyl SK64.

EXAMPLE 2

The operation described in Example 1 is repeated with the amount of sodium laurate increased to 66 g. After polymerization for 2 hours, the gauge pressure in the autoclave had fallen by 3 bars 6.10 kg of dry resin are collected.

The main characteristics of the resin obtained are collated in Table I.

EXAMPLE 3

20 kg of deionised water, 4.70 kg of polyvinyl chloride suspension resin marketed by Plastimer under the registered trade mark Ekavyl SK.66, and 22 g of sodium laurate are introduced in succession into the autoclave while the agitator is turning at 160 revolutions per minute, and 2 kg of vinyl chloride are added. The temperature of the reaction medium is brought to 58.5° C, and a solution of 4.5 g of potassium persulphate in 100 g of water is then introduced into the autoclave while pressurizing with nitrogen. After polymerization for 4 hours at this temperature, while maintaining the speed of agitation at 160 revolutions per minute, the gauge pressure in the autoclave has fallen by 3 bars. The reaction medium is then cooled and the residual monomer driven off.

After nitration and drying, 5.70 kg of resin are collected.

The main characteristics of the resin obtained and also those of Ekavyl SK.66 are collated in Table I.

TABLE I

| | Mean granulometry | Apparent density (gp/cc) | Melting time | Apparent density of dry blend prepared at | | |
|---|---|---|---|---|---|---|
| | | | | 50° C | 80° C | 120° C |
| Ekavyl Sk. 64 | 135μ | 0.58 | 6 mn | 0.63 | 0.63 | 0.66 |
| Example 1 | 152μ | 0.58 | 4 mn | 0.68 | 0.71 | 0.73 |
| Example 2 | 149μ | 0.57 | 1 mn 30 s | 0.67 | 0.68 | 0.75 |
| Ekavyl SK. 66 | 135μ | 0.57 | | 0.63 | 0.64 | 0.66 |
| Example 3 | 148μ | 0.58 | | 0.66 | 0.66 | 0.70 |

EXAMPLE 4 (comparative example for Examples 5 to 9):

A conventional vinyl chloride suspension polymer is prepared in accordance with the following formula and the following mode of operation:

| | |
|---|---|
| deionised water: | 20 kg |
| vinyl chloride: | 6.75 kg |
| polyvinyl acetate with a hydrolysis rate expressed in molar percentage of 72% and with a viscosity of a 4% aqueous solution at 20° C of 5 centipoises: | 13.5 g |
| methylcellulose: | 3.4 g |
| acetylcyclohexane sulphonyl peroxide: | 1 g |
| tertiobutyl perpivalate: | 1.7 g |

The colloids are previously dissolved in 10 kg of water, and the solution of colloids, 10 kg of water, and the oil-soluble polymerization initiators are then introduced into the autoclave described in Example 1. A vacuum is then established in the autoclave while the agitator rotates at 160 revolutions per minute, and 6.75 kg of vinyl chloride are introduced. The temperature of the reaction medium is brought to 59.5° C. After polymerization for 8 hours and 45 minutes at this temperature and at the previously mentioned speed of agitation, the gauge pressure in the autoclave has fallen by 1 bar. The reaction medium is cooled and the residual monomer degassed.

The product obtained is filtered and 5.4 kg of resin are collected after drying.

The main characteristics of the resin obtained are collated in Table III, where they can be compared with those of the resins obtained by the applicants' process in Examples 5 to 8.

EXAMPLE 5

A vinyl chloride polymer is prepared in accordance with the following formula and the following mode of operation:

| | |
|---|---|
| deionised water: | 20 kg |
| vinyl chloride: | 6.75 kg. |
| polyvinyl acetate identical to that in Example 4: | 13.5 g |
| methylcellulose: | 3.4 g |
| acetylcyclohexane sulphonyl peroxide: | 1 g |
| tertiobutyl perpivalate: | 1.2 g |
| sodium laurate: | 2 g |
| potassium persulphate: | 5.4 g |

The colloids are previously dissolved in 10 kg of water, whereupon the sodium laurate and the potassium persulphate are respectively dissolved in 100 g of water. The solution of colloids, 9.8 kg of water, and the oil-soluble polymerization initiators are introduced into the autoclave described in Example 1. A vacuum is then established in the autoclave while the agitator rotates at 160 revolutions per minute, and 6.75 kg of vinyl chloride are introduced. The temperature of the reaction medium is brought to 59.5° C. After polymerization for 7 hours at this temperature and at the previously mentioned speed of agitation, the sodium laurate solution and then the potassium persulphate solution are introduced while pressurizing with nitrogen and the polymerization is continued for an additional 2 hours and 15 minutes. The gauge pressure in the autoclave has then fallen by 2 bars. The reaction medium is cooled and the residual monomer degassed.

The product, which is easily filtered, gives a clear filtrate. 4.7 kg of resin are collected after drying.

The main characteristics of the resin obtained are collated in Table III.

EXAMPLES 6 to 9

The operation described in Example 5 is repeated with variations of the amount of sodium laurate, polymerization time $t_1$ before introducing the sodium laurate and potassium persulphate solutions into the autoclave, and the polymerization time $t_2$ after introduction of the solutions. The conditions of operation are indicated in Table II below.

TABLE II

| Example | Amount of sodium laurate | $t_1$ | $t_2$ | Pressure drop at the end of operation | Amount of polymer collected |
|---|---|---|---|---|---|
| 6 | 4 g | 7 hr | 2 hr 30 mn | 1 bar | 4.8 kg |
| 7 | 27 g | 7 hr | 1 hr 45 mn | 1 bar | 5.1 kg |
| 8 | 27 g | 7 hr | 3 hr 15 mn | 2 bars | 6.1 kg |
| 9 | 30 g | 8 hr | 1 hr 45 mn | 1.5 bars | 5.7 kg |

The main characteristics of the resins obtained are collated in Table III.

TABLE III

| Example | Mean granulometry | Setting time of plasticizer | Melting time | Apparent density g/cc of dry blend prepared at 50° C | 80° C | 120° C |
|---|---|---|---|---|---|---|
| 4 | 135μ | 17 mn | 6 mn | 0.62 | 0.63 | 0.67 |
| 5 | 145μ | 14 mn | 4 mn 30 s | 0.61 | 0.64 | 0.69 |
| 6 | 128μ | 8 mn | 3 mn | 0.64 | 0.64 | 0.73 |
| 7 | 140μ | 9 mn | 2 mn 30 s | 0.62 | 0.65 | 0.70 |
| 8 | 125μ | 14 mn | 4 mn | 0.61 | 0.64 | 0.68 |
| 9 | 133μ | 14 mn | 4 mn 30 s | 0.61 | 0.65 | 0.70 |

EXAMPLE 10

A conventional vinyl chloride suspension polymer is prepared in accordance with the following formula and mode of operation:

| | |
|---|---|
| deionised water: | 20 kg |
| vinyl chloride: | 6.75 kg |
| hydroxypropylmethylcellulose: | 17 g |
| acetylcyclohexane sulphonyl peroxide: | 1.3 g |
| tertiobutyl perpivalate: | 2.1 g |

The hydroxypropylmethylcellulose is dissolved in 10 kg of water.

The solution of colloids, 10 kg of water, and the oil-soluble polymerization initiators are introduced into the autoclave described in Example 1. A vacuum is then established in the autoclave while the agitator rotates at 160 revolutions per minute, and 6.75 kg of vinyl chloride are introduced. After polymerization for 5 hours and 45 minutes at this temperature and at the previously mentioned speed of agitation, the gauge pressure in the autoclave has fallen by 1 bar. The reaction medium is cooled and the residual monomer degassed.

The product obtained is filtered and 5.4 kg of resin are collected after drying.

The main characteristics of the resin are collated in Table IV, where they can be compared with those of the resin in Example 11 prepared in accordance with our process.

EXAMPLE 11

A vinyl chloride polymer is prepared in accordance with the following formula and mode of operation:

| | |
|---|---|
| deionised water: | 20 kg |
| vinyl chloride: | 6.75 kg |
| hydroxypropylmethylcelluose: | 17 g |
| acetylcyclohexane sulphonyl peroxide: | 1.3 g |
| tertiobutyl perpivalate: | 2.1 g |
| sodium laurate: | 27 g |
| potassium persulphate: | 4.5 g |

The hydroxypropylmethylcellulose is dissolved in 10 kg of water. The sodium laurate and the potassium persulphate are respectively dissolved in 100 g of water.

The solution of colloids, 9.8 kg of water, and the oil-soluble polymerization initiators are introduced into the autoclave described in Example 1. A vacuum is then established in the autoclave, while the agitator rotates at 160 revolutions per minute, and 6.75 kg of vinyl chloride are introduced. The temperature of the reaction medium is brought to 59.5° C. After polymerization for 4 hours and 15 minutes at this temperature and at the previously mentioned speed of agitation, the solution of sodium laurate and then the potassium persulphate solution are introduced while pressurizing with nitrogen, and the polymerization is continued for a further 1 hour and 15 minutes. The gauge pressure in the autoclave has then fallen by 0.8 bar. The reaction medium is cooled and the residual monomer degassed.

The product, which is easy to filter, gives a clear filtrate, and after drying, 5.4 kg of resin are collected.

The main characteristics of the resin obtained are collated in Table IV.

EXAMPLE 12

A conventional vinyl chloride suspension polymer is prepared in accordance with the following formula and mode of operation:

| | |
|---|---|
| deionised water: | 20 kg |
| vinyl chloride: | 6.75 kg |
| polyvinyl acetate with a hydrolysis rate expressed in molar percentage of 83% and with a viscosity of a 4% aqueous solution at 20° of 25 centipoises: | 17 g |
| acetylcyclohexane sulphonyl peroxide: | 1.3 g |
| tertiobutyl perpivalate: | 2.1 g |

The solution of colloids, 10 kg of water, and the oil-soluble polymerization initiators are then introduced into the autoclave described in Example 1. A vacuum is then established in the autoclave, while the agitator rotates at 160 revolutions per minute, and 6.75 kg of vinyl chloride are introduced.

After polymerization for 6 hours at this temperature and at the previously mentioned speed of agitation, the gauge pressure in the autoclave has fallen by 1 bar. The reaction medium is cooled and the residual monomer degassed.

The product obtained is filtered and 5.3 kg of resin are collected after drying.

The main characteristics of the resin are collated in Table V, where they can be compared with those of the resin of Example 13 according to our process.

EXAMPLE 13

A vinyl chloride polymer is prepared in accordance with the following formula and mode of operation:

| | |
|---|---|
| deionised water: | 20 kg |
| vinyl chloride: | 6.75 kg |
| polyvinylacetate identical to that used in Example 12: | 17 g |
| acetylcyclohexane sulphonyl peroxide: | 1.3 g |
| tertiobutyl perpivalate: | 2.1 g |
| sodium laurate: | 27 g |
| potassium persulphate: | 4.5 g |

The colloid is dissolved in 10 kg of water.

The sodium laurate and potassium persulphate are respectively dissolved in 100 g of water.

The solution of colloids, 9.8 kg of water, and the oil-soluble polymerization initiators are introduced into the autoclave described in Example 1. A vacuum is then established in the autoclave, while the agitator rotates at 160 revolutions per minute, and 6.75 kg of vinyl chloride are introduced. The temperature of the reaction medium is brought to 59.5° C. After polymerization for 3 hours and 30 minutes at this temperature and at the previously mentioned speed of agitation, the solutions of sodium laurate and potassium persulphate are introduced while pressurizing with nitrogen, and the polymerization is continued for an additional 2 hours. The gauge pressure in the autoclave has then fallen by 1 bar. The reaction medium is cooled and the residual monomer degassed.

The product, which is easily filtered, gives a clear filtrate. After drying, 5.4 kg of resin are collected.

The main characteristics of the resin are collated in Table V.

TABLE IV

| Example | Mean granulometry | Setting time of plasticizer | Melting time | Apparent density g/cc of dry blend prepared at | | |
|---|---|---|---|---|---|---|
| | | | | 50° C | 80° C | 120° C |
| 10 | 142μ | 44 mn | 15 mn | 0.66 | 0.69 | 0.71 |
| 11 | 126μ | 13 mn | 4 mn 45 s | 0.69 | 0.72 | 0.74 |

TABLE V

| Example | Mean granulometry | Setting time of plasticizer | Melting time | Apparent density g/cc of dry blend prepared at | | |
|---|---|---|---|---|---|---|
| | | | | 50° C | 80° C | 120° C |
| 12 | 117μ | 58 mn | >15 mn | 0.68 | 0.70 | 0.72 |
| 13 | 142μ | 19 mn | 7mn | 0.72 | 0.75 | 0.76 |

I claim:

1. A process for the preparation of a vinyl chloride polymer composition having superior physical properties which comprises polymerizing vinyl chloride monomer under suspension or bulk polymerization conditions to form vinyl chloride polymer particles having a mean diameter of from about 10 to 500 microns, adding to the reaction medium emulsion polymerization additives at a time when the polymer particles formed are from 5 to 99% by weight of the total resultant polymer product, polymerizing under emulsion polymerization conditions the vinyl chloride monomer to produce a product having vinyl chloride polymer granules of mean diameter of from about 0.02 to 2 microns agglutinated to the surface of the suspension or bulk polymerization prepared vinyl chloride particles.

2. A process for the polymerization of vinyl chloride polymer compositions having superior physical properties which comprises combining suspension or bulk polymerization prepared vinyl chloride polymer particles having a mean diameter in the range of from about 10 to 500 microns with vinyl chloride monomer, adding emulsion polymerization additives thereto, polymerizing the monomer under emulsion polymerization conditions to produce a product having vinyl chloride polymer granules having a mean diameter in the range of from about 0.02 to 2 microns agglutinated to the surface of the suspension or bulk prepared vinyl chloride particles.

3. The process of claim 2 wherein the weight ratio of the suspension or bulk polymerization prepared vinyl chloride polymer particles at the time of the addition of the emulsionization component to the total polymer product obtained at the end of the polymerization is between 5 and 99%.

4. The process according to claim 1, wherein the emulsion polymerization conditions include the presence of potassium persulfate, ammonium persulfate or redox pairs added in from 0.0001 to 5% by weight of the vinyl chloride monomer as a polymerization initiator.

5. The process of claim 1, wherein said suspension polymer is formed in the presence of from 0.001 to 5% by weight of suspension agent and from 0.0002 to 1% by weight of an oil-soluble initiator based on the weight of the monomer used in said suspension polymerization and the emulsion polymerization is carried out in the presence of from 0.005 to 10% by weight of an emulsifying agent and from 0.0001 to 5% by weight of a water-soluble emulsion initiator based on the weight of the monomer participating in said emulsion polymerization.

6. The process of claim 2, wherein said suspension polymer is formed in the presence of from 0.001 to 5% by weight of suspension agent and from 0.0002 to 1% by weight of an oil-soluble initiator based on the weight of the monomer used in said suspension polymerization and the emulsion polymerization is carried out in the presence of from 0.005 to 10% by weight of an emulsifying agent and from 0.0001 to 5% by weight of a water-soluble emulsion initiator based on the weight of the monomer participating in said emulsion polymerization.

7. A process for the preparation of a vinyl chloride polymer composition having superior physical properties which comprises adding to an aqueous media containing suspension or bulk polymerization prepared vinyl chloride polymer particles having a mean diameter in the range of from 10 to 500 microns, an emulsifier, an emulsion polymerization initiator and vinyl chloride monomer and emulsion polymerizing the monomer to produce a product having vinyl chloride polymer granules having a mean diameter in the range of from about 0.02 to 2 microns agglutinated to the surface of the suspension or bulk prepared vinyl chloride polymer particles; said emulsifier being in from 0.005 to 10% by weight and said initiator being in from 0.0001 to 5% by weight based on the monomer participating in the emulsion polymerization and said monomer being in an amount, at the time of the addition of said emulsion polymerization components, sufficient to have the weight ratio of the suspension or bulk polymer and the total polymer obtained at the end of the process to be between 5 and 99%.

* * * * *